United States Patent
Bauer et al.

(10) Patent No.: US 6,205,380 B1
(45) Date of Patent: Mar. 20, 2001

(54) PROCESS FOR PREPARING AN AREA PLAN HAVING A CELLULAR STRUCTURE AND COMPRISING A UNIT MOVING AUTOMATICALLY AND POSITIONED IN SAID AREA USING SENSORS BASED ON WAVE REFLECTION

(75) Inventors: Rudolf Bauer, Neubiberg; Uwe Wienkop, München, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/202,531

(22) PCT Filed: Jun. 16, 1997

(86) PCT No.: PCT/DE97/01218

§ 371 Date: Dec. 18, 1998

§ 102(e) Date: Dec. 18, 1998

(87) PCT Pub. No.: WO98/00767

PCT Pub. Date: Jan. 8, 1998

(30) Foreign Application Priority Data

Jul. 2, 1996 (DE) .............................. 196 26 628

(51) Int. Cl.$^7$ ...................................... G05D 1/03

(52) U.S. Cl. .................. 701/23; 180/169; 318/568.16

(58) Field of Search .................. 701/1, 23, 25, 701/300; 318/568.1, 568.16, 587; 180/167, 169; 901/1

(56) References Cited

U.S. PATENT DOCUMENTS

| | | | |
|---|---|---|---|
| 5,006,988 | 4/1991 | Borenstein | 701/25 |
| 5,525,883 | 6/1996 | Avitzour | 318/587 |

FOREIGN PATENT DOCUMENTS

| | | |
|---|---|---|
| 44 08 329 C2 | 5/1995 | (DE). |
| 44 08328 A1 | 9/1995 | (DE). |

OTHER PUBLICATIONS

IEEE, Intelligent Robots for Flexibility, Yokohama, Jul. (1993), vol. 2, J. A. Janét et al., "Sonar Windows and Geometrically Represented Objects for Mobile robot Self-Referencing", pp. 1324–1331.

IEEE Transactions on Robotics and Automation, vol. 12, No. 3, (1996), Joong Hyup Ko et al, "A Method of Acoustic Landmark Extraction for Mobile Robot Navigation", pp. 478–485.

IEEE Transactions on Robotics and Automation, vol. 7, No. 3, (1991), J. Borenstein et al, "The Vector Field Histogram–Fast Obstacle Avoidance for Mobile Robots", pp. 278–288.

(List continued on next page.)

Primary Examiner—William A. Cuchlinski, Jr.
Assistant Examiner—Edward Pipala
(74) Attorney, Agent, or Firm—Schiff Hardin & Waite

(57) ABSTRACT

The entry and the deletion of the degree of occupancy values in cellularly structured environment maps of autonomous mobile units is improved with the method. Dependent on the measuring directions of ultrasound sensors, different sectors in which the degrees of occupancy value are separately incremented are defined for each cell of the cellularly structured environment map. This has the advantage that an obstacle measured by different sensors only leads to an incrementation or a de-incrementation of the occupancy degree of a respective cell when this measurement ensued from the same measuring direction with respect to the cellularly structured environment map. Dynamic objects in the measurement area of the autonomous mobile unit can thus be more quickly deleted from the map and timeout measurements that have arisen due to reflections of echos do not lead to really existing objects being deleted from the map.

12 Claims, 3 Drawing Sheets

OTHER PUBLICATIONS

Proceedings of the (1992) IEEE/RSJ International Conference on Intelligent Robots and Systems, H. Chung, "Path Planning for a Mobile Robot with Grid Type World Model", pp. 439–444.

Automation in Construction, vol. 1, No. 2, (1992), W. C. Lin et al, "On dual ultrasound sensor technique for unmanned vehicles", pp. 153–165.

Proceedings of the International Conference on Robotics and Automation, (1994), vol. 2, B. Schiele et al, "A Comparison of Position Estimation Techniques Using Occupancy Grids", pp. 1628–1634.

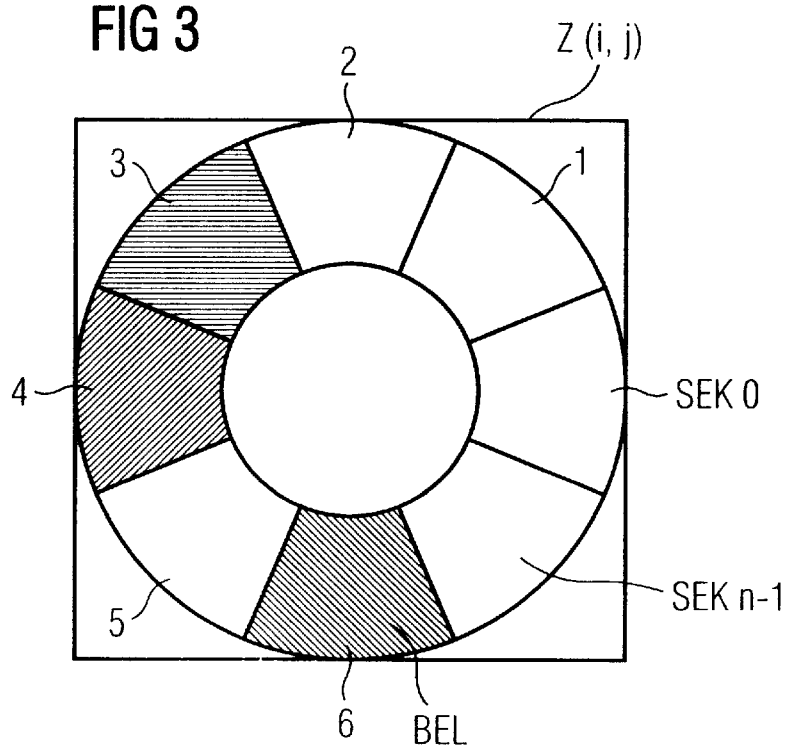
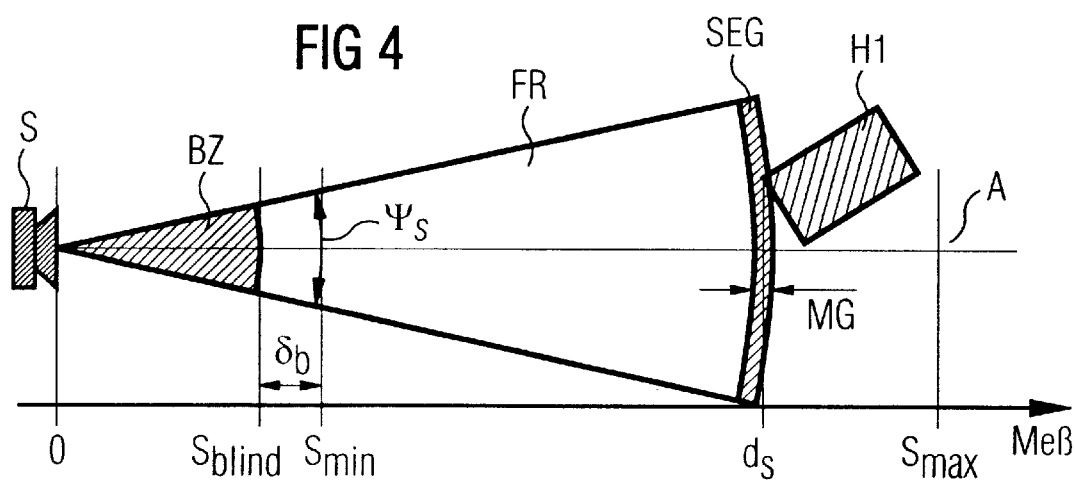

PROCESS FOR PREPARING AN AREA PLAN HAVING A CELLULAR STRUCTURE AND COMPRISING A UNIT MOVING AUTOMATICALLY AND POSITIONED IN SAID AREA USING SENSORS BASED ON WAVE REFLECTION

BACKGROUND OF THE INVENTION

In the orientation of autonomous mobile units like, for example, remote exploration probes, units that operate in danger zones, self-propelled industrial vacuum cleaners, transport vehicles and self-propelled robots, the problem arises that they must get their own impression of their environment. To that end, such an apparatus must construct a reliable map or its work environment and be simultaneously able to localize itself at any time on the basis of this map. It is thereby to be noted that an optimally fast evaluation and an optimally fast construction of this map can be required dependent on the speed of movement of such an apparatus. A practical method for the construction of such a map and for orientation of such a self-propelled mobile unit in an unknown environment is comprised therein that the unit constructs a two-dimensional grid of its environs and provides individual cells of this grid with degree of occupancy values. The degree of occupancy values assigned to a grid cell represent the occurrence of obstacles in the environment. Methods of this species are known from the Prior Art and shall form the basis for the present invention.

U.S. Pat. No. 5,006,788 discloses a basic method for the construction of cellularly structured environment maps that are provided with degree of occupancy values for representing obstacles. German Patent 44 08 329 C2 discloses recites a method with which the orientation of such a mobile unit within such a grid map can be improved, in that a coordinate reference point under the discretization provided by the map is defined in that a specific point of an autonomous mobile unit within an initial cell is defined as coordinate reference point. German Patent 4408 328 A1 recites another orientation method for autonomous mobile units within a grid raster wherein sensor properties such as blind areas and maximum distances to obstacles are co-involved for the evaluation of the map.

SUMMARY OF THE INVENTION

The object underlying the invention is comprised in specifying an improved method for the construction of a cellularly structured environment map by an autonomous mobile unit, whereby, in particular, the assigning of the degree of occupancy values and the deletion of the degree of occupancy values should be improved by the method.

A particular advantage of the inventive method is comprised therein that the measuring direction of the sensor from which an obstacle is measured is also taken into consideration in the storing of the degree of occupancy values per individual cell of the grid-shaped environment map. In this way, it can be assured that obstacles that are covered by different sensors over the course of time can only be deleted from the map when the sensors have acquired the respective obstacle from the same direction with reference to the cellularly structured environment map. What can thereby be particularly avoided is that existing obstacles are deleted due to mirror reflections of ultrasound echos via a timeout condition for the arrival of acoustic echos at the sensor, which can occur in that, for example, the unit moves along a smooth wall and following sensors whose measuring direction proceeds obliquely relative to the wall receive no reflections from the wall but only mirror reflections. This can lead thereto that a timeout condition for the arrival of echos makes the sensor think that the area in front of it is unoccupied because the wall is not registered due to the long running time of the echos of mirror reflections. As a result thereof, a cell that was marked "occupied" by a sensor that measures perpendicular to the wall can in turn be characterized as "free" by a following sensor that measures obliquely relative to the wall since this reduces its degree of occupancy due to the mismeasurement.

It is especially advantageously assured by the inventive method that the degrees of occupancy of cells that are located within the blind zone of an ultrasound sensor cannot be modified. The collision avoidance in the route planning of autonomous mobile units is thereby considerably improved in the near range, particularly in the blind area of the respective sensors. Otherwise, global incrementation and deincrementation strategies of the degree of occupancy values would lead thereto that the degrees of occupancy of cells that are located in the blind area of the unit but cannot be measured would likewise be modified.

Particularly advantageously, a maximum sensor range is defined by the inventive method in that a maximum signal running time that derives from the point in time the measuring pulse is output until the point in time of the arrival of the ultrasound echo is prescribed for the arrival of the ultrasound echos. A distance can be derived from this signal running time via the speed of sound. Objects in the environment that lie outside this maximum measuring distance are preferably no longer entered in appertaining cells of the environment map since reliably false measured results that derive from multiple echos or that depend on measuring pulses of other ultrasound sensors can thereby be avoided in the construction of the map. Degrees of occupancy of segments of cells that are located within an area between the measured object and the blind zone are especially advantageously deincremented according to the inventive method, since it is known for these cells that no obstacle can be located on them. The inventive method also advantageously provides that only those degrees of occupancy of cells that are located on the measuring beam be modified, so that the calculating outlay for the calculation of the degree of occupancy values of individual cells can be considerably reduced, and a good approximation for the results found in practice is achieved.

The degree of occupancy of a cell that is located on the circular arc segment that is established by the aperture angle of the measuring cone and by the distance of the obstacle is especially advantageously positively incremented, since it is known that the obstacle must be located on one of these cells.

A maximum value is especially advantageously defined for the degrees of occupancy of cells, since the calculating outlay in the determination of the respective degrees of occupancy of a cell can thus be kept constant, and an estimatable time outlay for the planning and evaluation of an environment map can thus be assured.

The increment can be especially advantageously varied dependent of the distance from the obstacle in the environment, since specific obstacles can thus be weighted higher or lower dependent on the speed with which the unit moves and on the distance from the unit.

The increment can thereby also be advantageously made dependent on the motion speed, in order to thus be able to take into consideration that the unit would more quickly collide with an obstacle given faster travel.

The autonomous mobile unit localizes itself especially advantageously on the basis of a coordinate reference point that is established by the exact position within an originating cell of the cellularly structured environment map. What is thus achieved is that the discretization that is prescribed by the cell size in the grid need not be employed for the coordinate origin; rather, finer resolution can be carried out therefor. This particularly plays a part when, dependent on measured distances from obstacles, that cell whose degree of occupancy or, respectively, whose degree of sector occupancy is to be incremented is to be determined.

In order to optimize the calculating outlay in the interpretation of the environment map and accelerate the route planning for an autonomous mobile unit, it is advantageously provide to employ different cell sizes for the cellularly structured environment map in the application of the inventive method; thus, cells at a farther distance from the unit can preferably be selected larger and cells lying closer to the unit can be selected smaller.

The invention is explained in greater detail below on the basis of the Figures. In this context, it should be reemphasized that the fundamentals for cellularly structured environment maps and methods for orientation in these environment maps that are recited in the above identified Prior Art are assumed for the rest of the specification.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 indicates an example for sectors of measuring direction areas for assigning degree of occupancy values within a cell of the environment map.

FIG. 4 illustrates characteristic quantities given measurement with an ultrasound sensor.

DESCRIPTION OF THE PREFERRED EMBODIMENTS

Figure 1:
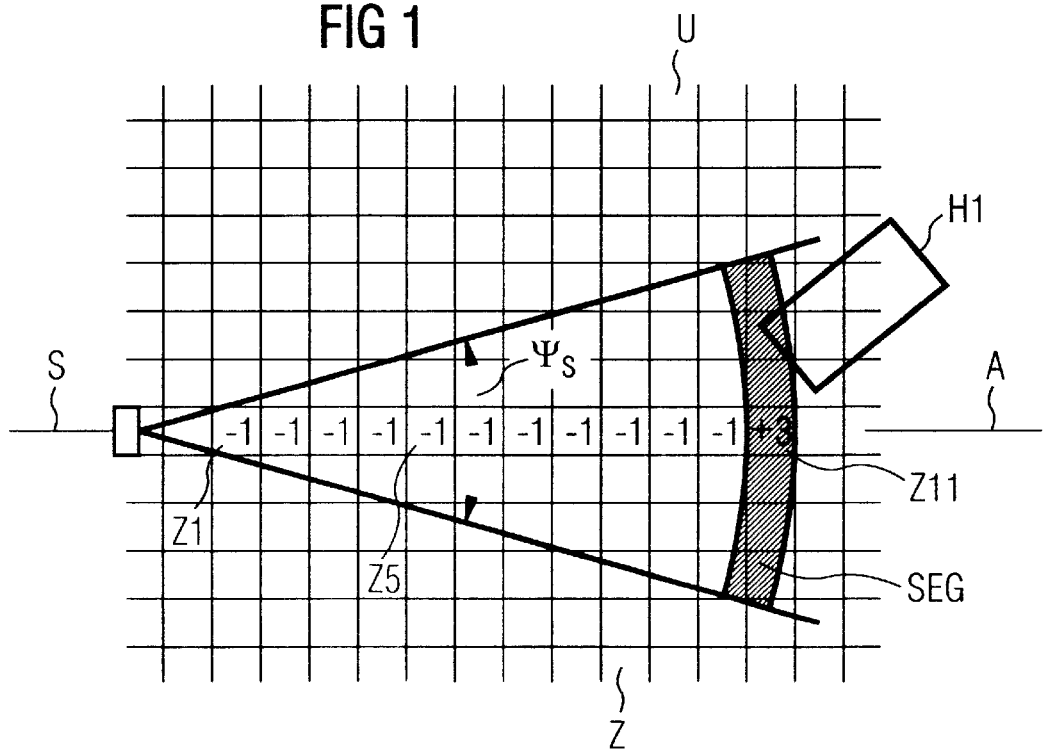
FIG. 1 shows an example of a cellularly structured environment map from the Prior Art.

FIG. 1 indicates an example of the basic method for forming cellularly structured environment maps according to U.S. Pat. No. 5,006,988. A sensor S, which measures the distance to an obstacle H1, is supposed to assign degrees of occupancy for cells Z within an environment map U. The measuring area of the ultrasound sensor is established by the aperture angle $\Psi_S$ of the acoustic front. What position they assume in relationship to the sensor cannot be stated for objects detected within the cone; rather, only their distance can be determined. For the sake of simplicity, all degrees of occupancy of those cells that are located on the symmetry axis A of the measuring cone are modified. Corresponding to the measuring imprecision of the sensor S, the only thing known is that the object H1 must be located on the segment SEG. Since no further obstacles can be located between the object H1 and the sensor, the degrees of occupancy of the corresponding cells Z1, Z5, etc., are modified, for example, by a negative increment, whereas the degree of occupancy of the cell Z11 that is located on the segment SEG and on the axis A is incremented by +3. A maximum degree of occupancy of 15 and a minimum degree of occupancy of 0 can preferably be provided. Dependent on these degree of occupancy values, the probability of the occurrence of an obstacle is indicated for the respective cell. The route planning of the autonomous mobile unit can preferably be implemented according to the assigned degree of occupancy values. Despite the simplification that only the degrees of occupancy of cells on the axis A are modified, practice has shown that an adequately accurate map can thereby be constructed since many measurements from different positions are registered during the travel of the autonomous mobile unit. Since, due to the modification of only cells lying on the axis A, it is not all degree of occupancy values of a [. . .] grid cells within the acoustic cone of the ultrasound sensor that have to be modified, this involves a considerable acceleration in the interpretation of measured results and entry of these measured results into the environment map, which in turn allows a very high measurement rate.

This method, however, has the disadvantage that the same cells are always modified given standstill of the unit, which would lead thereto that the content of the cell Z11 receives the maximum degree of occupancy and the degrees of occupancy of all other cells between the sensor and the cell Z11 on the axis A would be deleted. Further, this method has the disadvantage that the degrees of occupancy of cells that are not intersected by the beam axis A can no longer be reduced and thus block continued travel of an autonomous mobile unit in an inadmissible way. A further disadvantage of this method is comprised therein that what are referred to as timeout measurements are not employed for the interpretation and for updating the degrees occupancy. Timeout distances derived therefrom that, for example, one waits only a specific, maximum time until the arrival of an echo after the transmission of the measuring pulse of the sensor. The distance that sound can traverse in this time is referred to as the timeout distance. When no echo is received during the waiting time, then, for example, the timeout distance is supplied as a measured result. All degrees of occupancy of sectors of cells on the axis A are preferably reduced within the timeout distance by the inventive method.

Figure 2:
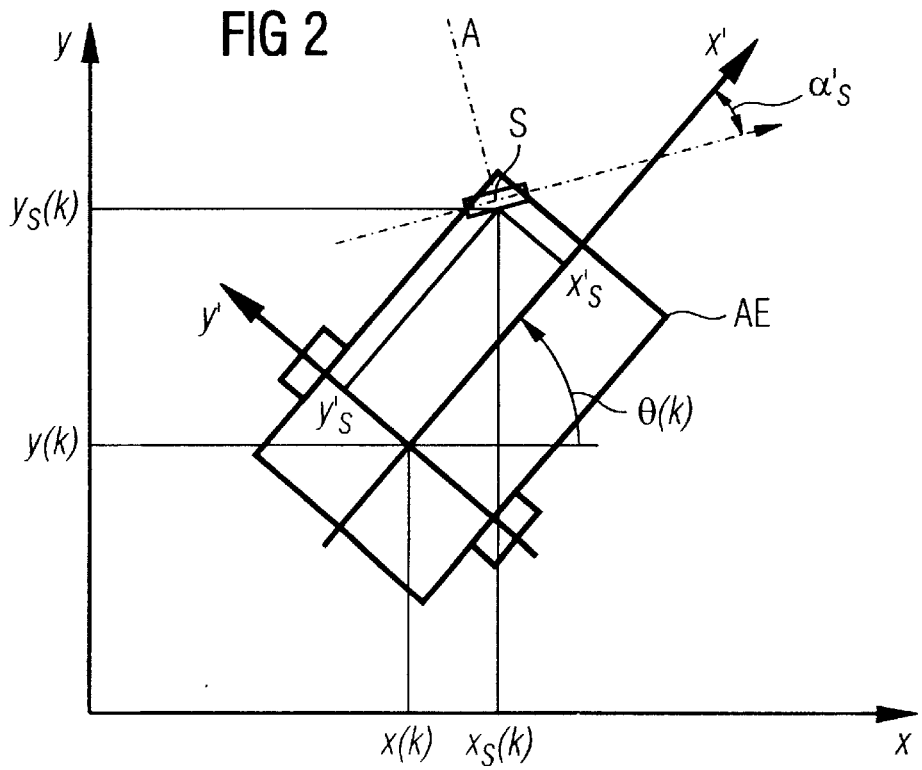
FIG. 2 indicates an example for the determination of the sensor alignment within the cellularly structured environment map.

FIG. 2 provides an example for determining the exact sensor alignment at an autonomous mobile unit AE that is referred to a coordinate system underlying the cellularly structured environment map. For acquiring the environs, the unit AE is preferably equipped with 24 commercially available ultrasound sensors. For example, the experimental robot was provided with $n_S$ (=24) ultrasound sensors. The position and orientation of a sensor S in its own coordinate system K' of the unit is established by $$a'_s = (x'_s, y'_s, \alpha'_s) \qquad (0.1)$$

The exact sensor positions, for example, can be predetermined. Given a global configuration of the unit $\overline{x}_r(K) = (x(K), Y(K), \theta(k))$ at time k, the global sensor position $a_s(k)$ $$a_s(k) = x_s(k), y_s(K), \alpha_s(k)) \qquad (0.2)$$

of a sensor s can be determined by a coordinate transformation $$x_s(k)=x(k)+x'_s\cos(\theta(k))-y'_s\sin(\theta(k))\ _s(k)=y(k)+x'_s\sin(\theta(K))+$$
$$y'_x\cos(\theta(k))\ \alpha_s(K)=\theta(k)+\alpha'_s \qquad (0.3)$$

Definition of the sensor positions, thereby, globally: $a_x(k)$, and locally: $a'_s$. Since the global sensor position $a'_s(k)$ is obviously dependent on the global configuration of the unit and, thus, on the time, the time index k is usually omitted below for reasons of clarity.

As an example, FIG. 3 shows a cell Z that is divided into sectors SEK with sectors for assigning directionally dependent, specific degree of occupancy values BEL. The height of the degrees of occupancy assigned is indicated here by the gray coloration of the corresponding sectors 1 through 6. According to the inventive method, such areas in the form of sectors are provided for all cells of the cellularly structured environment map. This procedure particularly plays a part when a plurality of sensors at the autonomous mobile unit are provided and these assign degree of occupancy values for cells of the environment map at different times. Each such areas, i.e. sectors, are indicated in FIG. 3 for assigning degree of occupancy values; however, an arbitrary plurality of such areas greater than or equal to 2 is conceivable. The plurality of sectors to be selected is thereby preferably based on the desired resolution for the cellularly structured environment map and based on the means available for the evaluation and for the route planning of the autonomous mobile unit. It is advantageously assured by the inventive method that, with the assistance of these direction-dependent sectors for degree of occupancy values, degree of occupancy values of individual cells that are modified by different sensors can only be modified in chronological succession in such form that all sensors are made equivalent with respect to their measuring direction in the cellularly structured environment map and the modification of the degrees of occupancy values for the respective sectors. For example, one can thus prevent that a timeout measurement that arises in that a sensor measures an obstacle obliquely, whereby the sound is then completely reflected thereat, this leading thereto that an echo may potentially arrive tardy at the sensor, does not relate to the same sensor as that which was modified by a different sensor for assigning the degree of occupancy of the same cell. What is thus avoided is that obstacles that are present and that were reliably detected by a sensor can in turn be deleted from the map due to the incorrect measurement of another sensor. What is likewise achieved is that dynamic obstacles that move through the measuring cone of a sensor can quickly be deleted from the cellularly structured map because the degree of occupancy is preferably immediately reduced in turn where the same sensor no longer encounters an obstacle in this sector in its mixed measurement.

Inventively, a polar histogram for the obstacle representation exists for every grid cell Z(i, j). This has an arbitrary angular resolution $\psi_o$, so that a whole number $n=360/\psi_o$ derives for the plurality of sectors. For example, $\psi_o=22.5$ (n=16) was selected in the experiments. Every sector κ thereby corresponds to a discrete angle δ

$$\delta=\kappa\psi_o,\kappa\in\{0,1\ldots,n-1\} \qquad (b\ 0.4)$$

that is a multiple of ψ. The sector κ is then calculated from the angle $\beta_s$ from which the corresponding grid cell Z(i, j) was seen by the sensor s, as $$\kappa=\text{floor}(\beta_s/\psi_o) \qquad (0.5)$$

An occupancy degree BEL $$BEL_K(i,j)\in\{0,\ldots,BEL_{max}\} \qquad (0.6)$$

with, for example, $BEL_{mas}=15$ exists per sector κ for each grid cell Z(i,j). The entire occupancy degree GBEL of a grid cell is preferably calculated from the sum of all occupancy degrees BEL. When the sum exceeds the maximum value $BEL_{max}$, then the sum is preferably limited to $BEL_{max}$ $$BEL(i,j)=\min\left(\sum_{k=0}^{n}BEL_k(i,j),BEL_{\max}\right) \qquad (0.7)$$

As an example Figure [. . . ] shows a single grid cell of an environment map with, for example, 8 sectors. The sectors 3, 4 and 6 thereby exhibit an occupancy degree unequal to zero. The different gray scale tones thereby indicate the level of the respective occupancy degree. The entire sector information is preferably stored once per grid cell.

FIG. 4 shows an example of a sensor that measures an obstacle H1 in the environment. The sensor S, the obstacle H1, the measuring imprecision MG, the symmetry axis of the propagation cone A, the aperture angle of the acoustic tone $\psi_s$ and a blind zone BZ of the sensor are shown. Further, a clearance FR between the blind zone and the obstacle H1 is shown. Cells of the environment map that are located within the blind zone BZ are preferably not modified in terms of their occupancy degrees as a result of the inventive method.

The minimum physical measuring distance $S_{blind}$ is mainly defined by the transmission power of the sensor. When an object is located within the blind zone and within the acoustic lobe of the ultrasound sensor, the sound is multiply reflected back and forth between the sensor and the object before the sensor is ready to measure after the decay of the membrane [sic]. As measured result, one obtains a value in the proximity of $S_{blind}$, whereby the returned measure value can also easily lie a few centimeters above this. The minimum measuring distance $S_{min}$ $$S_{min=Sblind}+\delta_b \qquad (0.8)$$

is therefore defined beginning with which an ultrasound sensor is sure to supply exact distance values. Given a blind zone expansion $\delta_b$ of 3 cm, the minimum measuring distance in trials amounted to 12 cm. It can be stated as a result that no precise statement about the distance of an object within the blind zone can be made given measuring values less than $S_{min}$. An object can potentially already be very close to the sensor or at the limit of the blind zone as well.

Given the ultrasound system employed, the maximum measuring distance $S_{max}$ ("timeout distance") is set by software within the predetermined limits. For example, a sensor thus maximally waits for the time $T_{us}$ before the maximum distance $S_{max}$ is returned as measured result. When no ultrasound echo was received, timeout measurements in interiors generally indicate mirror reflections wherein the emitted sound no longer returned to the sensor. Accordingly, such measurements are preferably as reflections. When a measured value is situated between $S_{min}$ and $S_{max}$, two information can preferably be acquired from this one measurement. First, the reflecting measured object lies somewhere in the region of acoustic cone at a distance $d_s$ from the sensor. Second, no object visible for ultrasound is located in the acoustic cone region between $S_{min}$ and $d_s$ since the distance thereof would otherwise have been measured.

There are at least two possible interpretations in the interpretation of the unoccupied information. First, it can be a matter of a mirror reflection, whereby the emitted ultrasound signal no longer returns to the sensor. Second, free space can actually be located in front of the sensor, so that no echo can be received. A third possibility is comprised therein that a sought object such as, for example, a cushion completely absorbs the ultrasound. This, however, cannot be recognized solely with ultrasound sensors. However, the case of complete absorption practically never occurs. When mirror reflections are fundamentally assumed given a timeout measurement, the measurement is simply ignored and the obstacle occupation of the cells within the acoustic lobe will not be deleted or lowered since, of course, value occupied information could be deleted. Given a real mirror reflection wherein an obstacle is located in the proximity of the sensor, this procedure is definitely correct. When, however, actual free space is located in front of the sensor, the unoccupied information acquired by the sensor measurement is not interpreted. Ignoring unoccupied information can raise great problems when grid cells had previously been incorrectly occupied with obstacles. Faulty occupations of grid cells, for example, ensue constantly due to the directional uncertainty of a measurement caused by the broad acoustic lobe. Serious faulty occupations can also be caused by dynamic obstacles. When a dynamic obstacle is visibly located in the measuring area of a sensor, then the occupied condition of the grid cell lying on the acoustic axis at the measuring distance $d_s$ is correctly incremented according to the sensor model. The occupied condition, however, is only correct for a short time span as long as the obstacle is located in the proximity of this grid cell. When this obstacle continues to move, occupied obstacle cells—incorrectly— remain in the map and these could prevent continued travel of the robot. When another visible obstacle is located behind the incorrectly occupied cells, this is not a problem since it would be very quickly deleted by obstacle measurements. When, however, free space such as, for example a corridor is located behind these cells, then only timeout measurements would ensue and these would not delete the incorrectly occupied cells due to non-interpretation of the free information. The occupied cells would certainly block continued travel. Preferably, ultrasound distance measurements are entered as follows in the cellularly structured environment map. The fundamental idea of Borenstein [1] is thereby essentially applied. A high degree of occupancy of a cell therein denotes that there is great plausibility that an obstacle is located in the corresponding cell of the environment map. Only the cell content of a single cell is preferably incremented per sensor measurement. In ultrasound measurements, this is preferably that cell that is located on the beam A and on which the sensor measurement comes to lie. All further cell contents along the beam axis are preferably de-incremented in the free space FR. This simple method requires only a little calculating time and can therefor be applied during travel. Movement of the robot as autonomous mobile unit thereby is more likely to have a positive effect on the map construction. Due to the entry of different measurements from different positions, the orientation uncertainty of a measurement caused by the aperture angle of the acoustic cone is very well compensated. According to the inventive method, however, the entry of an ultrasound measurement into the cellularly structured environment map is preferably undertaken on the basis of two cells. The one is the starting cell and the other is the ending cell. The starting cell is thereby the cell that is intersected first by the measuring axis A outside the blind area and the ending cell is that cell on which the object is located. I.e., the cell that is located at obstacle distance in the distance from the sensor on the axis A. Further details about this can be derived from German Patent 44 08 729 E2. The cells that lie between the starting and the ending cell in the free space FR are preferably de-incremented. The de-incrementation preferably begins outside the blind zone, since it has been shown after many tests with objects within the blind zone that measuring distances not only in the proximity of the blind zone but also between $S_{min}$ and $S_{max}$ were sometimes returned by the sensor system. It can thus occur that the measured object is located within the blind zone given a measured result between $S_{min}$ and $S_{max}$. When, however, cell contents within the blind zone are never deleted, this leads to a significantly better collision avoidance behavior in very tight use environments.

Figure 5:
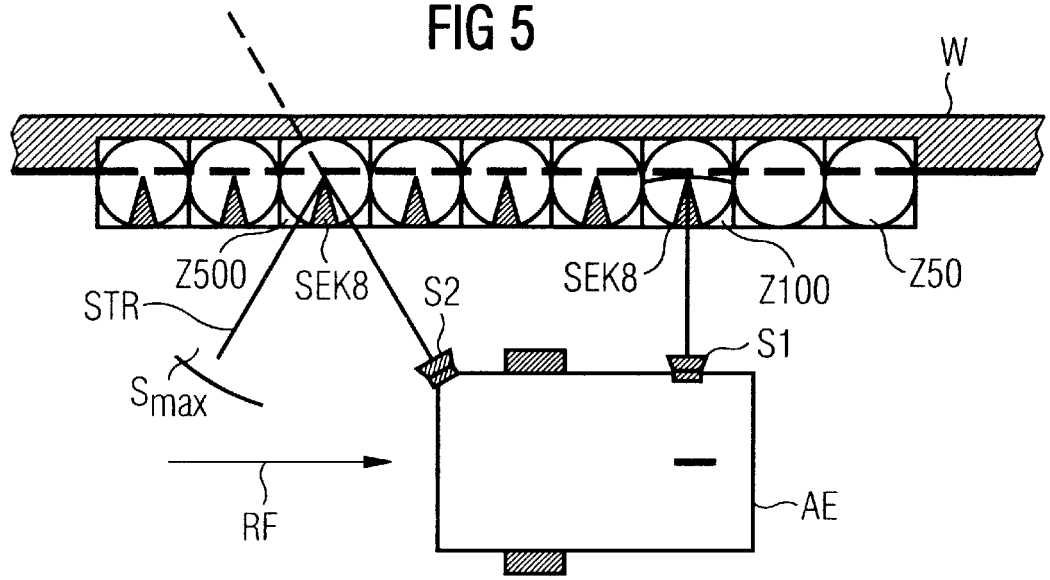
FIG. 5 indicates an example of a measuring procedure improved by the inventive method.

FIG. 5 shows a measuring procedure that is improved by the inventive method. The autonomous mobile unit AE moves along a travel direction RF in a corridor, which is represented here by a wall W. This extremely smooth wall reflects ultrasound very well. The cells Z50, Z60, Z100 and Z500 from the environment map of the unit are shown here. During the motion event along the travel direction RF, the unit and its sensors S1 and S2 measure the wall and sectors are provided with degree of occupancy values according to the inventive method. Since the sensor S1 resides perpendicular to the wall, the ultrasound signal is reflected extremely well and is also received by it extremely well. In the region of the cell Z100, the sector SEK8, which corresponds to the perpendicular measuring direction in this case, is allocated to the sensor S1 in FIG. 5 as a result of the corresponding measuring direction. i.e., when this sensor detects obstacles in this measuring direction, then they are entered in this sector SEK8. When the wall W is extremely long, then the sector SEK8 will be constantly provided with an incremented degree of occupancy during travel. This derives therefrom that the sensor S1 constantly measures the wall and preferably increments the degree of occupancy of SEK8 with every echo. During continuation of the motion, however, the same sector or, respectively, the same cell Z100 is likewise measured by the sensor S2 of the autonomous mobile unit AE, this sensor S2 measuring obliquely relative to the wall. This situation is shown with reference to the cell Z500. It can be clearly seen that the axis or, respectively, the beam course STR of the wave front from the sensor is smoothly reflected by the wall, this leading to a timeout measurement given the distance $S_{max}$. According to the inventive method, however, this timeout measurement does not to the occupancy degree of the sector SEK being modified since this measurement ensues at an angle that, for example, is allocated to the sector SEK7. In this way, the inventive method avoids having correct measured results from cells of the environment map provided with degree of occupancy values being erroneously deleted due to mismeasurements.

Figure 6:
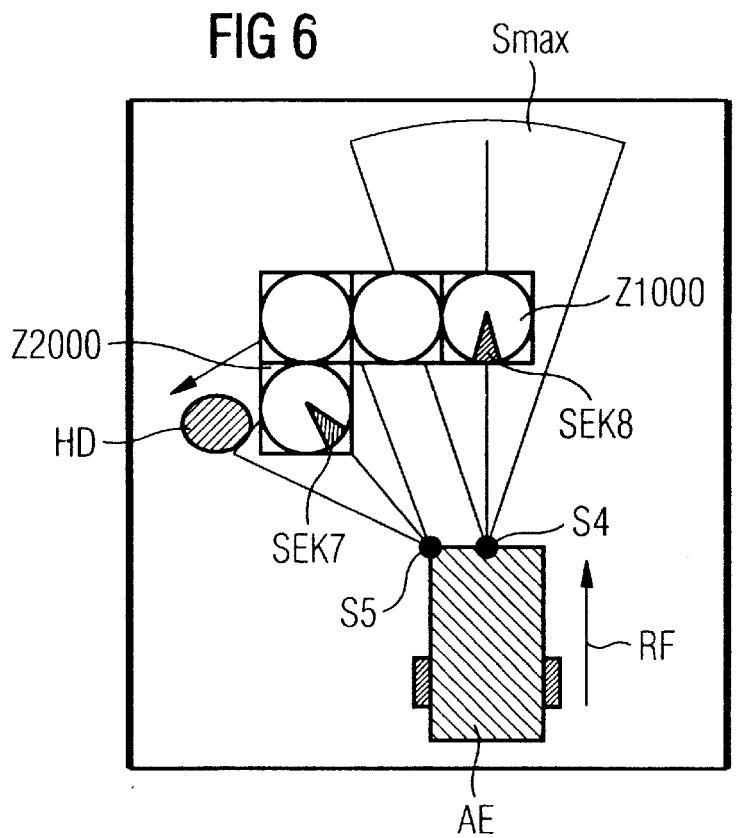
FIG. 6 indicates a further example of a measuring procedure improved by the inventive method.

FIG. 6 shows an applied instance wherein the inventive method leads to further advantages in the interpretation. In this case, for example, an obstacle HD has moved from left to right through the observation space of the sensor S4. This lead to the fact that the sensor S4 of the autonomous mobile unit, which moves along in the direction RF in the cell Z1000, occupied the sector SEK with a degree of occupancy that arose due to a distance measurement when the obstacle HD moved passed. In a further measurement following thereupon with the sensor S4, this obstacle can in turn be removed from the map with the assistance of a timeout measurement $S_{max}$, in that the degree of occupancy in the sector SEK8 of the cell Z1000 is de-incremented. The obstacle he rapidly moving past subsequently produces an elevated occupancy degree in the sector SEK7 of the cell Z2000 as a result of a distance measurement by the sensor S5.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for producing a cellularly structured environment map of a self-propelled mobile unit which orients itself in an environment using sensors based on wave reflection, comprising the steps of:

determining a distance of the sensor from an environmental object a position of the object as undefined location on a circular arc segment of a circle by at least one sensor with the sensor as center of the circle and the distance as radius, the circular arc segment being limited by a measuring area of the sensor;

determining an alignment of the sensor with respect to the cellularly structured environment map as a measuring beam;

dividing a cell of the environment map into at least two sensor alignment areas as sectors and determining an occupancy degree of the cell as a function of the alignment of the sensor; and determining an overall occupancy degree of the cell from the occupancy degrees of the sectors of the cell.

2. The method according to claim 1, wherein a blind zone in measuring direction of at least one sensor is prescribed dependent on a measuring imprecision of the sensor, said blind zone adjoining the sensor; and wherein the occupancy degree of the sector of a cell of the environment map that is located within the blind zone is not modified.

3. The method according to claim 1, wherein at least one maximum sensor range is prescribed dependent on a running time criterion for a maximum running time between an emitted measuring pulse and a received signal echo; and wherein the occupancy degree of the sector of a cell of the environment map that is located outside the sensor range is not modified.

4. The method according to claim 1, wherein dependent on a measuring interval, the occupancy degree of a respective sector of at least one cell that is located on the measuring beam that proceeds at symmetry axis of a conical wave front from the sensor to the environmental object is negatively incremented.

5. The method according to claim 1, wherein the occupancy degree of the sector of a cell that is located on the circular arc segment is positively incremented.

6. The method according to claim 1, wherein a maximum occupancy degree is prescribed per cell, the maximum occupancy degree not being allowed to be exceeded given an additive linkage of all occupancy degrees stored per cell for sectors.

7. The method according to claim 1, wherein an increment with which the occupancy degree is incremented is dependent on the distance of the environmental object.

8. The method according to claim 7, wherein the increment for a relatively small distance is selected greater than the increment for a relatively great distance.

9. The method according to claim 1, wherein an increment with which the occupancy is incremented is dependent on a moving speed of the self-propelled mobile unit.

10. The method according to claim 9, wherein the increment is selected greater for a relatively high travel speed than for a low travel speed.

11. The method according to claim 1, wherein an exact position of a coordinate reference point of a coordinate system underlying the cellularly structured environment map within an originating cell of the environment is employed as an intrinsic position of the self-propelled mobile unit at the point in time of a measurement; and wherein an exact alignment and position of the sensor relative to the coordinate system is determined for a respective measurement based on the intrinsic position of the unit and the location of the unit, and on a position of the sensor at the unit.

12. The method according to claim 1, wherein cells of different sizes are employed for producing the environment map.

* * * * *